United States Patent Office

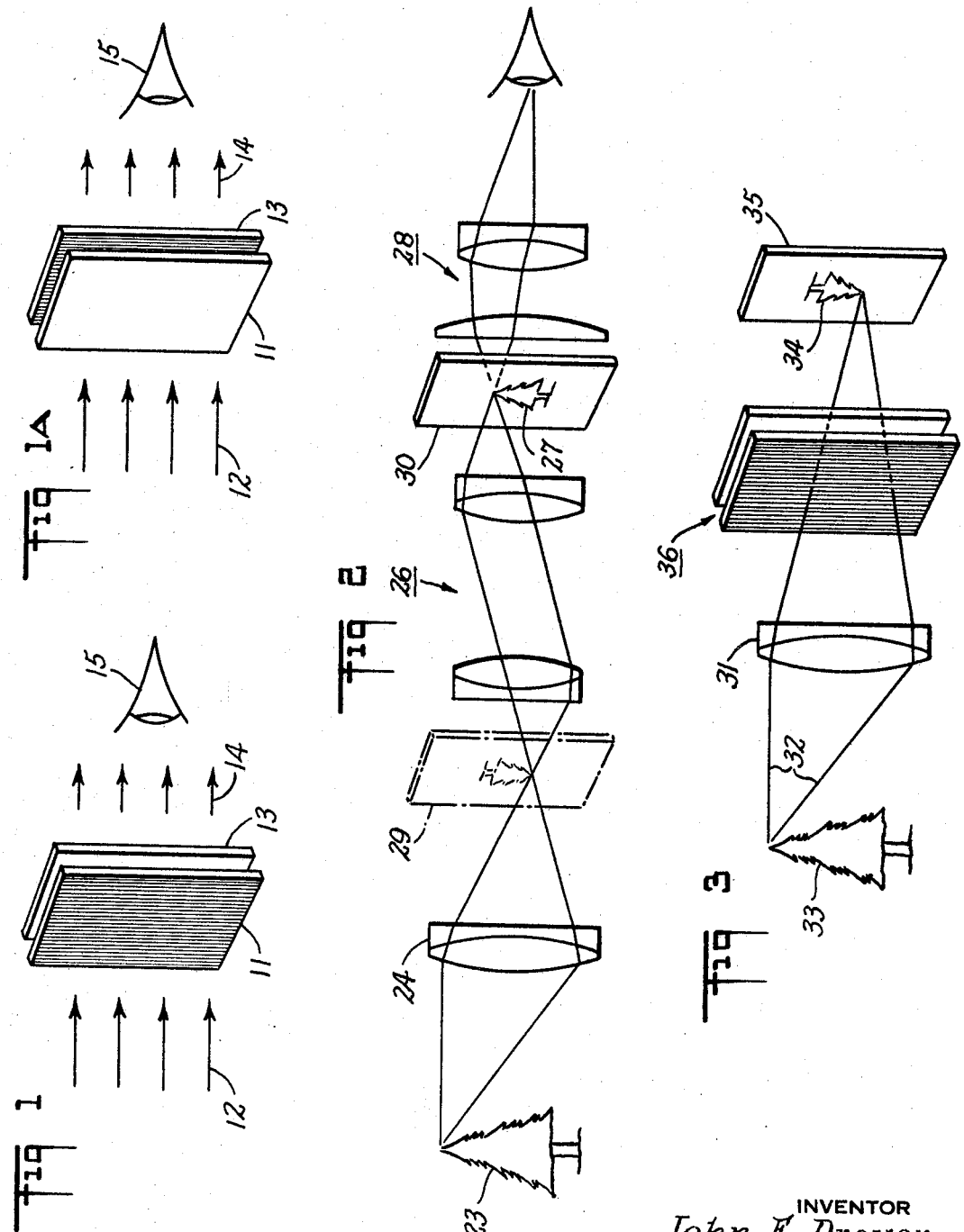

3,386,788
Patented June 4, 1968

3,386,788
OPTICAL CHANGE DETECTION DEVICE
John F. Dreyer, Cincinnati, Ohio, assignor to Polacoat Incorporated, Blue Ash, Ohio
Filed Oct. 7, 1963, Ser. No. 314,197
6 Claims. (Cl. 350—160)

ABSTRACT OF THE DISCLOSURE

An optical device for detecting changes in a distribution pattern of actinic light by generation of an image of a changing light distribution pattern, wherein actinic light from said distribution pattern is intercepted by paired pellucid positively phototropic and negatively phototropic materials showing substantially equal but opposite changes in optical density upon illumination by said actinic light, said phototropic materials differing in their rate of phototropic response.

---

This invention relates to methods for selectively detecting changes in light intensity, to devices for detecting such changes, and to optical systems employing said methods and devices.

Certain optical systems in nature are selectively sensitive to changes in their environment. Thus, for example, researchers have discovered that the optical and nervous systems of the frog are such that the frog selectively sees only those portions of his environment which are important to his adaptation to his environment. Thus, the frog mainly sees motion and is capable of detecting the rapid movement across the field of vision of prey or predators, while the optical and nervous systems screen out extraneous environmental stimuli, such as the slow movement of clouds, which are of no great consequence to the frog's existence.

The present invention relates to synthetic systems, devices, and methods similarly for selectively detecting or responding to changes in light patterns. By appropriate modification of such systems, a variety of selectivities can be developed, and the devices, methods, and systems of the invention have utility in a wide number of fields.

The present invention makes use of the phenomenon of phototropy, that is of the reversible change in the optical properties (absorbance, transmittance, reflectance, etc.), of a body on exposure to and removal from a source of suitable stimulating radiation. Although it is to be understood that phototropy broadly may include changes in the optical properties of bodies at non-visible wave lengths, for example, changes in the absorbance or reflectance of ultraviolet or infrared light, the systems of particular interest in the present application are photochromotropic, that is, involve reactions with the reversible formation of color. However, as used herein, the term "phototropy" is to be understood as applying broadly to phototropic reactions, as well as to photochromotropic reactions of particular interest in systems involving visible light.

Two types of phototropy must be defined and distinguished: positive phototropy and negative phototropy. By a "positive" phototropic system is meant herein a system whose optical density is increased on exposure to activating radiation, for example by the development of color. In positive phototropic systems, termination of exposure of the system to active radiation permits a reversion of the system to a less absorptive, i.e. a more transmissive (e.g. a less intensely colored), system. On the other hand, a "negative" phototropic system, as defined herein, is one which is initially highly absorptive, e.g. opaque to incident radiation or colored, but which becomes less absorptive or more highly transmissive on exposure to active radiation. Upon cessation of radiation of negative phototropic systems with activating light, the systems revert to a more absorptive (e.g. colored) state.

The present invention comprises devices, methods and systems employing a plurality of adjacent positively and negatively phototropic bodies, particularly pellucid (i.e. transparent or translucent) positively and negatively phototropic bodies through which light may be transmitted.

A better understanding of the present invention and of its many advantages will be had by referring to the accompanying drawings in which FIGS. 1 and 1A are schematic perspective views of of a selective detecting device according to the present invention;

FIG. 2 is a schematic view of an optical system having at least one focal plane and in which positively and negatively phototropic materials are positioned at a focal plane for detection of an image in the focal plane;

FIG. 3 is a schematic view of a system having at least one focal plane in which adjacent positively and negatively phototropic bodies are positioned outside the focal plane.

FIG. 1 shows negatively phototropic body 11 on which light rays 12 are incident. Adjacent body 11 is positively phototropic body 13 to which rays 12 are transmitted on passage through body 11. Emergent rays 14, after passage through both phototropic bodies, are detected by detecting means 15, shown as the human eye. Since negatively phototropic body 11 is opaque, colored, or otherwise highly absorbing in the absence of radiation stimulating phototropic reactions in the body, few of rays 12 are incident on or transmitted by body 13 under these conditions, pictured in FIG. 1. If, now, incident light rays 12 comprising wavelengths of stimulating radiation causing a phototropic reaction are played upon negatively phototropic body 11, as shown in FIG. 1A, the body will lighten in color or otherwise decrease in optical density while, conversely, the stimulating radiation transmitted by body 11 and incident on body 13 will cause an increase in optical density of body 13.

By a suitable choice of negative and positive phototropic substances from among the many phototropic materials known to those skilled in the art, by blending known phototropic materials, or by increasing or decreasing the thickness of layers 11 or 13 or the concentration of phototropic materials in said layers, the color intensities of bodies 11 and 13 can be balanced so that light rays 12 of FIGS. 1 and 1A are uniformly transmitted by the device as rays 14.

That is, for example, color lightening in layer 11 caused by exposure to stimulating radiation passes radiation causing a darkening in layer 13 equal in intensity to the lightening in layer 11. Because the respective increase and decrease in transmission of the layers 11 and 13 may be made substantially equal, the light 14 transmitted by the system as a whole may be made substantially unchanging in intensity.

However, this result is only reached if the rate of phototropic response of the materials in both adjacent bodies is substantially the same. If the rate of phototropic response in each of the two layers is different, transitory differences in the transmission of the two layers will clearly result. For example, if the phototropic response of negative phototropic body 11 of FIG. 1 is more rapid than that of positive phototropic body 13, the incidence of stimulating radiation 12 on body 11 will cause the body to become less opaque to rays 12, which then will be transmitted by both layer 11 and initially transmitting body 13 until slower reacting positive phototropic layer 13 responds to the stimulating radiation incident thereon. Thus, for a period of time dependent on the relative rates of phototropic response in the two layers, light will be transmitted through both layers of the device of FIG. 1 until equilibrium conditions are again restored by darkening of body 13.

Thus, will it be seen that changes in the intensity of light incident on and effecting phototropic responses in negative and positive phototropic bodies 11 and 13 of FIG. 1 will result in the disturbance of those equilibrium conditions which give an observer a visual field invariant in intensity under conditions of static illumination. Since motion will result in changes in a pattern of light intensity, detecting devices 15 such as the human eye will be able to detect such motion in corresponding changes in the light transmitted by the otherwise invariantly transmitting device of FIG. 1.

The sensitivity of the arrangement of FIG. 1 to dynamic illumination is related to the degree of lag in phototropic response between two layers 11 and 13, the rate of change of the conditions of illumination, and the degree of contrast between an object viewed and its background. Generally, the degree of lag in the response of the two layers is suitably such that changes in conditions of illumination are detected (i.e., a sufficiently great degree of lag), but yet is as simultaneous with the change in conditions as is consistent with this objective.

FIG. 2 shows an optical system employing a device operating on the same principles as that shown in FIG. 1. FIG. 2 shows an optical system comprising objective lens arrangement 24 for viewing object 23, first focal plane 29, reversing lens system 26, ocular lens system 28, and second focal plane 30 in which is positioned a pellucid body comprising a mixture of positively and negatively phototropic substances of different response rate. If object 23 is invariantly illuminated, e.g., is static under a constant light source, image 27 cast at focal plane 30 will be invisible if the image is formed on a body in which the optical brightening of a negatively phototropic material is just balanced by the darkening of a positively phototropic material, even if the materials are of different response rate. However, movement of object 23 causing changes in the intensity pattern of light incident on the system or other changes in the lighting of object 23, will cause imbalances in the color harmony of the negative and phototropic materials at focal plane 30, thus producing a visible or otherwise detectable image 27 of object 23.

It will be understood that both positive and negative phototropic materials can alternatively be positioned at focal plane 29 of FIG. 2, as shown by the dotted lines, with equivalent results. Also, a negative pellucid phototropic body can be positioned at 29 in FIG. 2 while a positive pellucid body is positioned at 30. Here, the bodies are separated physically, but adjacent in the light path between object and viewer.

Although a system such as shown in FIG. 2 is useful for the detection of dynamically illuminated objects by the eye, the system may also be used with photoelectric detecting devices which will respond to significantly rapid change in light intensity at focal plane 30. For example, the detecting device may be a video camera which would register a picture only of moving objects but not of still objects. Thus the device would find utility as a visual daytime burglar alarm. Devices of the type shown in FIG. 2 can also be used for the detection and measurement of the speed of objects moving parallel to the focal plane of the devices. Because an object approaching or receding perpendicularly from the focal plane will change in apparent size, an optical system such as in FIG. 2 can also be used for detecting and measuring objects moving in these directions. As mentioned earlier, devices like those shown in FIG. 2 need not be photochromotropic. For example, systems analogous to the known "snooperscope" systems and responding in the nonvisible spectrum (e.g., the infrared) could be used to detect the movement of objects in the dark.

FIG. 3 of the accompanying drawings shows still another use for a device such as is shown in FIG. 1. In the figure, lens 31 focuses light rays 32 from object 33 to form image 34 on focal plane 35 of an optical system. In the optical system outside the focal plane, adjacent negative and positive phototropic bodies 36 having different response rates are interposed to interrupt the light passed between object 33 and image 34 in the focal plane. The optical system of FIG. 3 is comparable, for example, with that of a camera having chemical shutter means 36 between object 33 to be photographed and focal plane 35. Phototropic bodies 36 act as a shutter, for example, by providing a negative phototropic layer of high optical density on which light 32 from object 33 to be photographed is incident. Thus, in the absence of stimulating radiation tending to decrease the absorbance of the negative phototropic layer, no light reaches focal plane 35, where a sensitive photographic film may be placed, for example. Upon suitable exposure of the negative phototropic layer to stimulating radiation, such radiation being present either as illumination incident on object 33, or contained within the system of FIG. 3 itself (for example enclosed within a camera), negative phototropic body of combination 36 decreases in optical density, permitting radiation to pass through the now transmissive negative phototropic layer and through a more slowly responding positive phototropic layer adjacent thereto. However, at a certain period of time later, dependent upon the different rate of phototropic response of the positive phototropic body, the originally pellucid positive body 36 will again become opaque, thus again cutting off light incident upon the focal plane from the object 33. In the time interval between the clarification of the negative layer and the opacification of the positive layer on exposure to stimulating radiation, light from object 33 will be able to reach focal plane 35 permitting image 34 of the object to be reproduced. Eventually both exposed phototropic bodies will again reach a static state in which the negative phototropic body is opaque while the positive phototropic body again becomes clear.

By appropriate choice of the difference of rates in response of the positive and negative layers, chemical shutters widely differing in their rapidity of response can be prepared. In view of the rapidity of chemical reactions, photographic shutters having speeds heretofore unobtainable by mechanical means can be constructed according to the present invention.

A wide variety of materials—both organic and inorganic—show phototropic reactions and can be used in the negatively and positively phototropic bodies of the invention. Among the phototropic organic substances are the anils, or Schiff bases, which are condensation products of aldehydes and primary amines. Among these may be mentioned, for example, the salicylidene of m-toluidine.

Sulfoxides such as 1,2-acetyl-aminonaphthyl-4-disulfoxide are also phototropic.

Numerous fulgides are phototropic, as well as fulgic acid, and salts and esters of fulgic acids. Examples of such materials are dipehnyl-fulgic acids, etc. Salts and esters include sodium diphenyl-fulgide, etc.

Numerous hydrazones have been found to be phototropic, including the reaction products of naphthyl hydrazine with aldehydes, esters, ketones and diketones including benzaldehyde and cinnamic aldehyde, etc.

Various ozazones are also phototropic.

The semicarbazones, phenyl-semicarbazones, diphenyl-semicarbazones, and thiosemicarbazones of cinnamaldehyde, etc., are phototropic.

Phototropic stilbene derivatives include: diformyl-4,4-diaminostilbene-2,2'-disulfonic acid, etc.

Other organic compounds which are phototropic are anhydrous quino-quinoline hydrochloride, N-(5-bromosalicylidene)benzylamine, N - (5 - bromosalicylidene)-methylamine, tetrachloroketonaphthalene, spirans, isonicotinic acid-o-nitrobenzylidene hydrazide, the oxide of 2 - chloro - 2 - ethyl - 3 - hydroxy - 3 - phenylhydrindone, p-diethyl- and p-dimethyl-aminophenyliminocamphor, brucine salts of chloro-nitro-methionic and bromo-nitromethionic acids, diphenyl-acyl-diphenylmethane, and p- and o-benzilidenedioxy-p-benzoin.

Some of the aforementioned materials are phototropic as solids. Many organic materials exhibit phototrophy when in solution. Among these materials are naphthylaminocamphor in methanol, ethanol, acetone, ether, bromoform, chloroform, or chloral alcoholate, etc. Tetrahydronaphthylaminocamphor and m-phenylene-bisaminocamphor are phototropic in chloroform, as is chlorophyll in methyl alcohol. 10,10′-dihydroxydiphenyl-9,9-diamine is phototropic in ether and benzine. Aminoazo dyes such as 4-aminoazobenzene are phototropic in ethyl alcohol, acetyl cellulose, and ethyl cellulose. Malachite green carbinol and crystal violet carbinol are phototropic in alkaline ethyl alcohol. Auramine cyanide, brilliant green cyanide, crystal violet cyanide, malachite green and pararosaniline cyanides are phototropic in ethyl alcohol. Sulfites of crystal violet, malachite green, methyl-violet, pararosaniline hydrochloride, and rosaniline are all phototropic in water containing sulfur dioxide. A yellow aqueous solution of potassium ferrocyanide containing a little phenolphthalein turns red under light, and reverts to yellow in the dark. Equimolar mixtures of diphenyl-mono - biphenyl - methane and diphenyl-monobiphenylmethyl chloride are phototropic.

Among inorganic materials which are phototropic are cuprous chloride and bromide, bismuth oxalate, lithium imide, cadmium iodide, minerals such as pink hackmanite and apatite, and alkaline earth sulfides containing manganese or zinc salts as activators. Barium, calcium and strontium titanates containing small amounts of divalent iron, divalent tin, pentavalent antimony, or pentavalent vanadium show phototropy.

Phototropic mercury salts i n c l u d e: $HgClCNO$; $HgBrCNO$; $HgICNO$; $HgClCNS$; $HgICNS$; $HgClCNSe$; $HgBrCNSe$; $HgICNSe$; $HgHSCNS$; $HgHSCNSe$;

$$HgCl_2 \cdot 2HgS$$

$HgBr_2 \cdot 2HgS$; $HgI_2 \cdot 2HgS$; $HgCl_2 \cdot 2HgSe$; $HgBr_2 \cdot 2HgSe$; $HgI_2 \cdot 2HgSe$; $Hg(SCN)_2 \cdot 2HgO$; $Hg(SCN)_2 \cdot 2HgS$;

$$Hg(CNSe)_2 \cdot 2HgS$$

$IHgSSHgI$; $HgBrCl$; $HgIBr$; $HgICl$; and certain mixtures of $Ag_2S \cdot HgI_2$.

$TiO_2$ undergoes reversible color changes in the presence of traces of $Fe_2O_3$.

Several mechanisms are operative in producing phototropy in compounds like those mentioned above. These can be divided into several classes: (1) a change from trans to cis forms; (2) salt isomerism; (3) ring opening and closing; (4) removal of an electron from its ground state; (5) oxidation-reduction.

The stilbenes, for example, are phototropic because of shifts between cis- and trans-isomers having unequal possibilities for resonance.

Triphenylmethane dyes such as ethyl violet go from the leuco colorless to the dye form and back and are one type of salt isomerization dye. The polymethine dyes are another type of salt isomerization material.

Spirans are phototropic due to opening and closing of a ring structure.

Sodalite, $3-(Na_2O \cdot Cl_2O \cdot 2SiO_2)$, with small amounts of NaCl or $Na_2S$ is phototropic due to impurity f-centers.

Redox phototropy requires the presence of more than isomeric species of the same molecule, since a transfer of atoms between different substances is involved. In the "light reaction," or reaction triggered by the absorption of activating radiation, one substance present is oxidized and another reduced, the energy for the reaction being supplied by the activating radiation. The "dark reaction" or "back reaction," i.e. the reaction occurring out of the presence of the activating source, is a return to the status quo ante by reduction of the oxidized compound, and oxidation of the compound reduced in the light reaction.

These phototropic materials and others may be employed per se as the pellucid negative and positive phototropic bodies shown in FIG. 1, for example. Otherwise, they may be suitably employed in solution, dispersion, or suspension in a solid, liquid, or gel matrix to form bodies 11 and 13 of FIG. 1. Layers 11 and 13 of FIG. 1 need not be abutting or in contact, as suggested in the figure, but may obviously be spatially separated. Their immediate juxtaposition is not critical, providing that light transmitted by body 11 is later incident on body 13, i.e. that the elements are optically adjacent. The term "adjacent" as used herein will refer to such optical adjacency.

The difference in rate of phototropic response between the negative and positive phototropic systems described in the invention can be obtained by several means. First, different phototropic materials having the same phototropic mechanism may differ inherently in their phototropic response, or inherent differences in phototropic response rate may be present in systems having different phototropic mechanisms. For example, redox reactions are generally slower than salt isomerization ionization reactions so that phototropic systems involving salt isomerization are generally inherently more rapid than systems involving redox type reactions. Also, a system having a low molar absorption coefficient requires more light energy to alter its transmission and hence is slower, requiring longer periods of incident illumination. In the salt isomerization type of phototropic reaction, the back reaction (the reaction occurring in the absence of light) is increased by increasing the amount of bleaching anion present in the phototropic system.

In view of the wide variety of phototropic systems available to those skilled in the art, the activating or stimulating radiation employed to activate the devices of the present invention may be in positions of the spectrum such as the ultra-violet or the visible. Numerous combinations of devices and systems may be devised according to the invention, and are enhanced by the possibility of the addition of fixed filters in an optical system for the selective passage of certain wave-lengths.

Illustrative of the invention, a negative phototropic body was prepared by dissolving methylene blue in alcohol. Ascorbic acid or ferrous sulfate is suitably added as reducing agent. By adding resin to the resulting solution and casting between transparent glass plates, a negatively responding phototropic gel body was prepared which would bleach on exposure to near ultraviolet light and return to the colored form on removal of the radiation.

A second cell evidencing positive phototropic reactions was prepared by dissolving ethylviolet and sodium hydroxide (to produce the leuco form of the dye) in alcohol, dissolving a resin therein and casting as a gel between pellucid glass plates. This system was colorless except when irradiated with near ultraviolet light. Reversion to the colorless form occurred on termination of illumination. The concentration of dye chosen was such that changes in intensity equal in magnitude—but opposite in sign—to those observed in the negative phototropic layer were obtained on exposure to the same intensity of incident illumination. The two systems differed inherently in their rate of phototropic response.

Numerous other dyes may be employed to prepare negative phototropic layers according to the invention. For example numerous oxazine, azine, and thiazine dyes are negatively phototropic, including oxazine dyes such as Brilliant blue C (blue to colorless), Indine blue 2RD (violet to colorless) and Nile blue sulfite (blue to pink). Suitable azine dyes include the eurhodines such as neutral red (red to colorless) and rosindones, such as Rosinduline G (red to yellow). Thiazine dyes other than methylene blue include Toluidine blue O (violet to colorless), Thionine blue (violet to colorless), and Thionol blue (dark blue to colorless).

Particularly suitable positively phototropic materials include salt isomerization dyes, such as the triphenylmethane and polymethine dyes. The photoropic salt isomerization dyes have at least two nitrogen atoms separated by an even number of conjugated single and double bonds. In their ionic form, the dyestuff molecules are capable of resonating according to the following scheme:

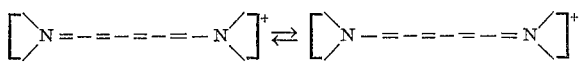

In the formulas, the alternating single and double lines indicate a series, indefinite but even in number, of conjugated bonds, usually carbon-carbon or carbon-nitrogen bonds, which may be in an aliphatic chain and/or in one or more rings, alicyclic or aromatic, including multiple and fused ring systems.

Typical triphenyl methane dyes of this type are the well known methyl violet, ethyl violet, crystal violet, malachite green, the wool violets, aniline blue, light green S8, and many others well known to the art. The structure of a typical triphenylmethane dye is exemplified by the structure of malachite green shown below:

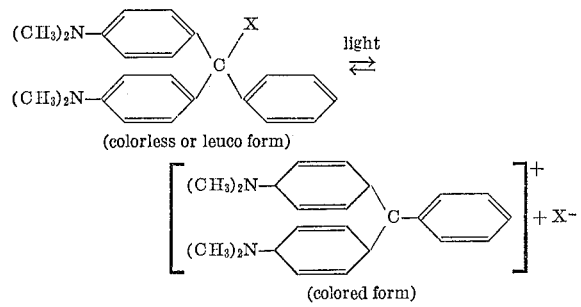

where X is an anion, for example, the anion of a weak acid such as hydrogen cyanide.

Typical polymethine dyes are those disclosed in U.S. Patent 2,813,802, granted to Ingle et al. on Nov. 19, 1957. As disclosed in said patent, the polymethine dyes are bis(p-aminophenyl)vinylcarbonium compounds whose colored ions have the characteristic essential structure:

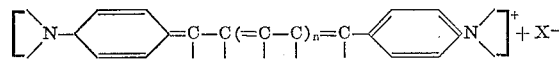

(or equivalent resonance forms), wherein $n$ is equal to 0, 1, 2, or 3, and X is a strong acid anion. As disclosed in said patent, preferred substituents for attachment to the nitrogen atom of the polymethine dyes are hydrocarbon groups, especially lower alkyl groups such as methyl, ethyl, isopropyl, n-propyl, n-butyl, 2-ethylhexyl, etc., but other substituents such as hydrogen atoms or high alkyl groups such as cetyl or stearyl groups, other hydrocarbon groups such as alkenyl, aryl, aralkyl, or alicyclic radicals, or hydrocarbon radicals substituted with groups such as hydroxy, alkoxy, sulfonic acid, halo, amino, nitro groups, etc., are also suitable. Preferred substituents for attachment to the terminal methine carbon atoms are aryl groups, especially aryl groups substituted with halo especially chloro, amino, hydroxy, alkoxy, N-alkyl and N,N-dialkyl amino groups, etc., but other substituents such as those mentioned with respect to the nitro atom substitutents of the foregoing paragraph are also suitable. Preferred substituents for attachment to the other, nonterminal, methine carbon atoms are hydrogen atoms or lower alkyl groups such as are mentioned above, but other substituents, including those mentioned earlier above as substituents, are acceptable.

Numerous examples of dyes of this type are given in Patent 2,813,802. Because of the complexity of the structure and naming of these compounds, repetition of all this subject matter will be avoided here, but attention is called to column 4, lines 1–15 and to the examples of the patent. It is to be understood that the teachings of Patent 2,813,802 with respect to polymethine dyes are incorporated herein by reference.

The optically adjacent phototropic bodies of the invention may constitute physically separate entities, as discussed above, or may be made into a single structure. For example, one phototropic system may be incorporated into a suitable matrix, such of a plastic such as polymethyl methacrylate, while the second phototropic system is coated over the matrix material. Compatible positive and negative phototropic materials may be combined into a single body simply by mixing. Alternatively, one or both of the materials may be encapsulated in a pellucid inert material before dispersion in the presence of the other phototropic substance.

Although specific embodiments have been described, and shown in the drawings, and although various preferences, recommendations, and alternatives have been given, it is to be understood that these are not exhaustive or limiting of the invention, but are illustrative and for the purpose of instructing others in the principles of the invention and how to modify it so that they may be able to use it in a variety of embodiments as best suited to the conditions and requirements of a particular use.

What is claimed is:

1. A phototropic optical device for generating an image of a changing actinic light distribution pattern in its field of view, comprising means for forming an image of an actinic light distribution pattern, said means having at least one focal plane, phototropic means for intercepting image-forming light from said image-forming means, said phototropic means comprising a pair of pellucid positively phototropic and negatively phototropic materials showing substantially equal but opposite changes in optical density when illuminated by a changing actinic light distribution pattern, said phototropic materials differing in their rate of phototropic response, whereby image-forming light, after interception by said phototropic means, will form an image in a focal plane of said image-forming means only upon a change of actinic light distribution in the field of view.

2. A device as in claim 1 wherein said positively phototropic and negatively phototropic materials are separately present in at least two pellucid bodies.

3. A device as in claim 1 wherein said positively phototropic and negatively phototropic materials are combined in a single pellucid body.

4. An optical device as in claim 1 wherein said positively phototropic and negatively phototropic materials are positioned in at least one focal plane of said device.

5. An optical device as in claim 1 wherein said positively phototropic and negatively phototropic materials are positioned outside a focal plane of said device.

6. An optical device as in claim 1 wherein said positively phototropic and negatively phototropic materials are photochromotropic.

References Cited

UNITED STATES PATENTS

| | | | |
|---|---|---|---|
| 1,921,630 | 8/1933 | Mechau. | |
| 2,074,226 | 3/1937 | Kunz et al. | 250—71 |
| 2,710,274 | 6/1955 | Kuehl | 54—2.77 |
| 3,085,469 | 4/1963 | Carlson | 88—24 |
| 3,105,761 | 10/1963 | Foris | 96—27 |
| 3,270,638 | 9/1966 | Anwyl et al. | 350—160 X |
| 3,270,639 | 9/1966 | Windsor | 95—64 X |

FOREIGN PATENTS

| | | |
|---|---|---|
| 891,992 | 3/1962 | Great Britain. |

DAVID H. RUBIN, *Primary Examiner.*

T. H. KUSMER, *Assistant Examiner.*